(12) United States Patent
Sakata

(10) Patent No.: US 8,572,213 B2
(45) Date of Patent: Oct. 29, 2013

(54) INFORMATION PROCESSING APPARATUS AND METHOD FOR CONTROLLING THE SAME TO MEDIATE THE TRANSFER OF A PROCESS REQUEST FROM A CLIENT TO A FILE SERVER

(75) Inventor: Munetaka Sakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 12/942,854

(22) Filed: Nov. 9, 2010

(65) Prior Publication Data

US 2011/0153784 A1    Jun. 23, 2011

(30) Foreign Application Priority Data

Dec. 22, 2009  (JP) .................. 2009-291403

(51) Int. Cl.
*G06F 15/16* (2006.01)
(52) U.S. Cl.
USPC .......................... 709/219; 713/300
(58) Field of Classification Search
USPC .......................... 709/219; 713/300
See application file for complete search history.

(56) References Cited

U.S. PATENT DOCUMENTS

| | | | | |
|---|---|---|---|---|
| 5,742,833 | A * | 4/1998 | Dea et al. .................. | 713/323 |
| 7,356,665 | B2 * | 4/2008 | Rawson, III .............. | 711/202 |
| 7,480,729 | B2 | 1/2009 | Fujihara | |
| 7,539,841 | B2 * | 5/2009 | Rawson, III .............. | 711/202 |
| 7,603,574 | B1 * | 10/2009 | Gyugyi et al. ............ | 713/300 |
| 8,095,810 | B2 * | 1/2012 | Matsuzawa et al. ...... | 713/320 |
| 8,132,033 | B2 * | 3/2012 | Innan et al. ............... | 713/324 |
| 8,375,235 | B2 * | 2/2013 | Innan et al. ............... | 713/324 |
| 2003/0034877 | A1 * | 2/2003 | Miller et al. .............. | 340/5.61 |
| 2005/0160151 | A1 * | 7/2005 | Rawson, III .............. | 709/213 |
| 2008/0209244 | A1 | 8/2008 | Miller et al. | |
| 2009/0132839 | A1 * | 5/2009 | Rothman et al. .......... | 713/320 |
| 2011/0072288 | A1 * | 3/2011 | Miller et al. .............. | 713/323 |

FOREIGN PATENT DOCUMENTS

| | | |
|---|---|---|
| JP | 4133459 B2 | 8/2008 |
| JP | 2009-176033 | 8/2009 |
| JP | 2009-266088 | 11/2009 |

OTHER PUBLICATIONS

Japanese Office Action issued Aug. 26, 2013 in corresponding Japanese Application No. 2009-291403.

* cited by examiner

*Primary Examiner* — Brian P Whipple
(74) *Attorney, Agent, or Firm* — Fitzpatrick, Cella, Harper & Scinto

(57) ABSTRACT

An information processing apparatus includes a first reception unit receiving condition setting information which specifies a permission condition for permitting access to a file server and is sent from the file server when the processing apparatus transitions from a first power supply mode to a second power supply mode in which power consumption is less than that in the first power supply mode, a second reception unit receiving a process request with respect to the file server from a client computer, a determination unit determining whether the process request received by the second reception unit satisfies the permission condition specified in the condition setting information, and a transfer control unit sending a response indicating a refusal of access to the client computer without transferring the process request received by the second reception unit to the file server when the determination unit has determined that the permission condition is not satisfied.

15 Claims, 16 Drawing Sheets

FIG. 4

| FILE FILTER | PDF / JPEG / TIFF |

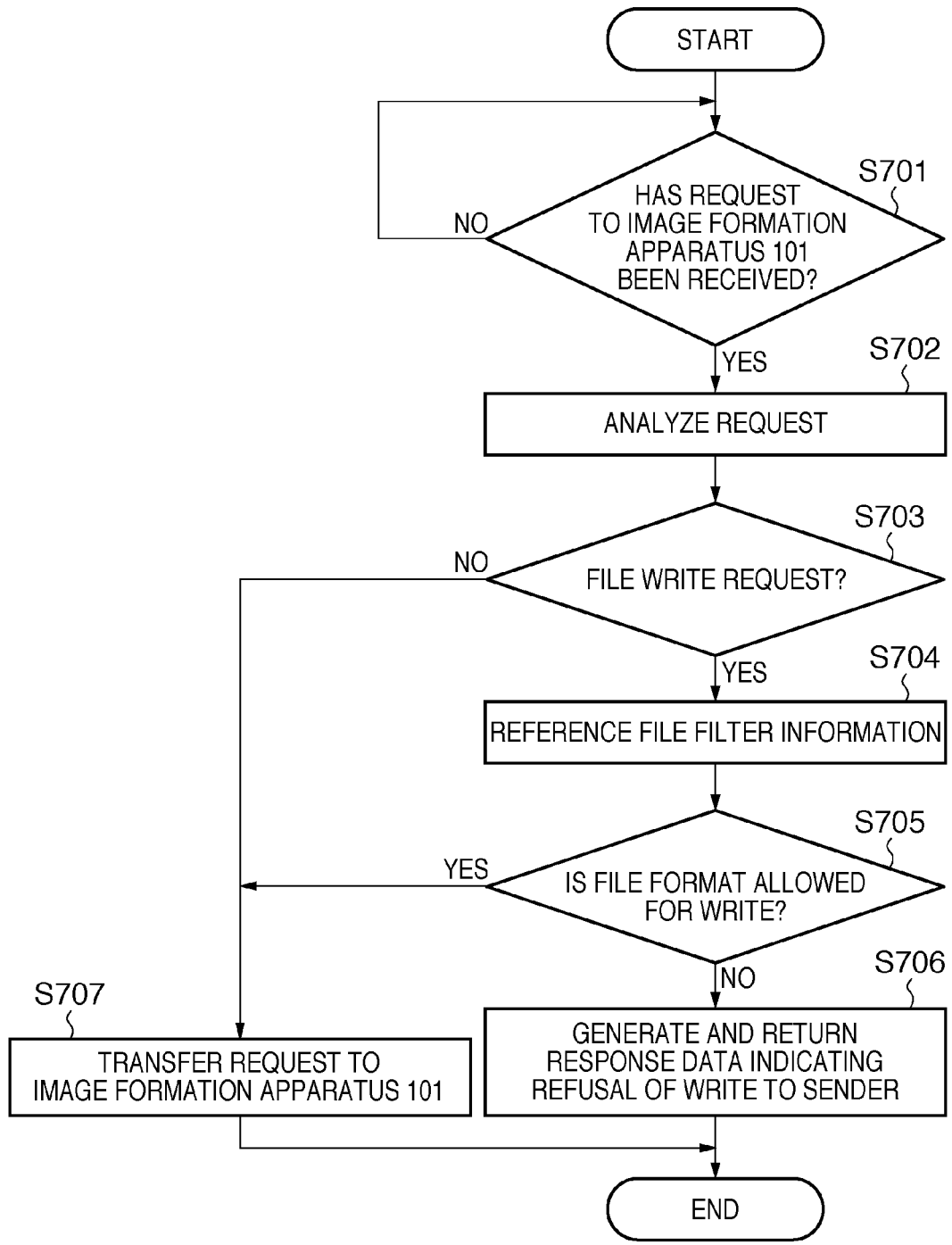

FIG. 8A

| FREE DISK SPACE | 1.0GByte |
|---|---|
| USER NAME / PASSWORD | user.db |
| DIRECTORY / FILE INFORMATION | fileinfo.db |
| REQUEST INFORMATION | request_acl.db |

FIG. 8B

| USER NAME | PASSWORD |
|---|---|
| taro | taro-san |
| santaro | santaro-san |

FIG. 9A

| DIRECTORY / FILE PATH | OWNER | AUTHORITY 1 (OWNER) | AUTHORITY 2 (NON-OWNER) | SIZE | DATE OF CREATION |
|---|---|---|---|---|---|
| \taro\Private | taro | rw | - | - | 2009/01/01 |
| \taro\Private\INVITATION CARD (IN PREPARATION).pdf | taro | rw | - | 1024 | 2009/01/11 |
| \taro\Public | taro | rw | rw | - | 2009/01/01 |
| \taro\Public\INVITATION CARD (FINISHED).pdf | taro | rw | rw | 2048 | 2009/01/31 |

FIG. 9B

| REQUEST | REFUSED | PERMITTED |
|---|---|---|
| CREATE | santaro | taro |
| COPY | santaro | taro |
| MOVE | santaro | taro |
| DELETE | santaro | taro |
| GET | - | ALL |
| PROPFIND | - | ALL |

FIG. 12A

| USER NAME | PASSWORD | MEMBERSHIP GROUP |
|---|---|---|
| taro | taro-san | group 1 |
| santaro | santaro-san | group 2 |

FIG. 12B

| DIRECTORY / FILE PATH | OWNER | AUTHORITY 1 (OWNER) | AUTHORITY 2 (GROUP) | AUTHORITY 3 (OTHER) | SIZE | DATE OF CREATION |
|---|---|---|---|---|---|---|
| \taro | taro | rw | - | - | - | 2009/01/01 |
| \taro\ INVITATION CARD (IN PREPARATION).pdf | taro | rw | - | - | 1024 | 2009/01/11 |
| \group1 | taro | rw | rw | - | - | 2009/01/01 |
| \group1\INVITATION CARD (IN REVIEWING) .pdf | taro | rw | rw | - | 2048 | 2009/01/31 |
| \share | taro | rw | rw | rw | - | 2009/01/01 |
| \share\ INVITATION CARD (FINISHED).pdf | taro | rw | rw | rw | 4096 | 2009/02/14 |

F I G. 13
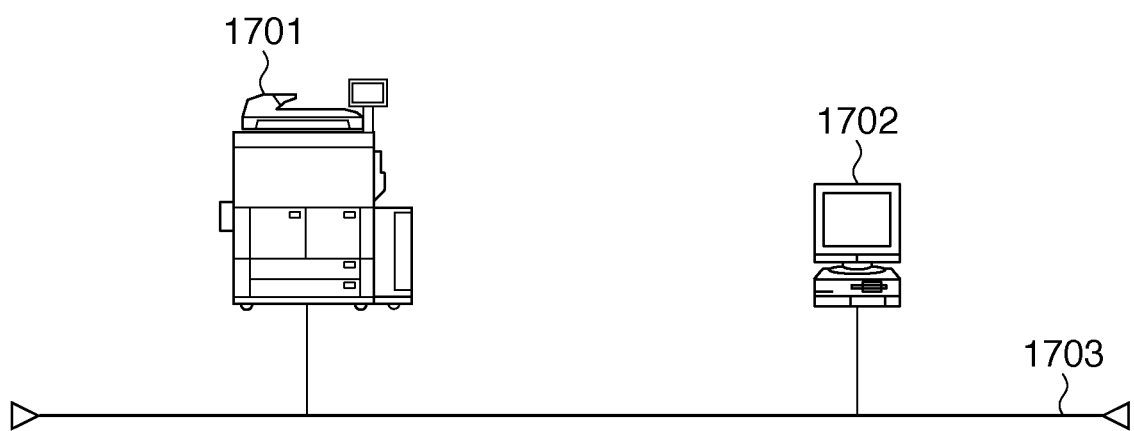

INFORMATION PROCESSING APPARATUS
AND METHOD FOR CONTROLLING THE
SAME TO MEDIATE THE TRANSFER OF A
PROCESS REQUEST FROM A CLIENT TO A
FILE SERVER

BACKGROUND OF THE INVENTION

1. Field of the Invention

The present invention relates to an information processing apparatuse which mediates the transfer of a process request from a client computer to a file server, and a method for controlling the information processing apparatuse.

2. Description of the Related Art

Conventionally, techniques of reducing the power consumption of a processing apparatus including a file server have been proposed. For example, in Japanese Patent No. 4133459 (Document 1), a device for connecting multiple lines (a so-called hub) stores a request command for which a proxy response is to be performed, and its response information (the remaining amount of toner, etc.) in association with each other. The hub device, when receiving a request command for which a proxy response is to be performed, responds with stored response information, and when receiving a request command for which a proxy response is not to be returned, sends a wake-up signal to the processing apparatus before transferring the received request command. Therefore, the power saving mode of an apparatus connected to the hub device can be continued for a longer period of time, resulting in a higher power saving effect. Another technique has been proposed in which a printable office document is saved in a file server of an image formation apparatus, and therefore, a print command can be issued by a user operating an operation panel of the image formation apparatus without activating a printing application in a client computer.

There is, however, typically a predetermined limit on a process request for writing, reading, or the like of the file server, depending on the file format, the presence or absence of an access authority, or the like. Therefore, if all process requests are transferred to the processing apparatus (e.g., an image formation apparatus) without taking the limit into account as in the conventional art, the processing apparatus is frequently returned from the power saving mode to the normal power mode, and therefore, the reduction of power consumption is hindered.

SUMMARY OF THE INVENTION

The present invention has been made in view of the above problem. The present invention provides an information processing apparatus in which only a process request(s) permitted access from a client computer to a file server is transferred to the file server, thereby reducing the power consumption of a processing apparatus including the file server, and provides a method for controlling the information processing apparatus.

According to one aspect of the present invention, there is provided an information processing apparatus can be interposed between a client computer and a processing apparatus including a file server, the information processing apparatus comprises a first reception unit configured to receive condition setting information which specifies a permission condition for permitting access to the file server, the condition setting information being sent from the file server when the processing apparatus transitions from a first power supply mode to a second power supply mode in which power consumption is less than that in the first power supply mode; a second reception unit configured to receive a process request with respect to the file server from the client computer; a determination unit configured to determine whether the process request received by the second reception unit satisfies the permission condition specified in the condition setting information; and a transfer control unit configured to send a response indicating a refusal of access to the client computer without transferring the process request received by the second reception unit to the file server when the determination unit has determined that the permission condition is not satisfied.

According to another aspect of the present invention, there is provided a method for controlling an information processing apparatus can be interposed between a client computer and a processing apparatus including a file server, the method comprises the steps of: receiving condition setting information which specifies a permission condition for permitting access to the file server by using a first reception unit of the information processing apparatus, the condition setting information being sent from the file server when the processing apparatus transitions from a first power supply mode to a second power supply mode in which power consumption is less than that in the first power supply mode; receiving a process request with respect to the file server from the client computer by using a second reception unit of the information processing apparatus; determining whether the process request received by the second reception unit satisfies the permission condition specified in the condition setting information, by using a determination unit of the information processing apparatus; and sending a response indicating a refusal of access to the client computer without transferring the process request received by the second reception unit to the file server when the determination unit has determined that the permission condition is not satisfied, by using a transfer control unit of the information processing apparatus.

According to the present invention, provided are an information processing apparatus in which only a process request (s) permitted access from a client computer to a file server is transferred to the file server, thereby reducing the power consumption of a processing apparatus including the file server, and a method for controlling the information processing apparatus.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram showing contents of a shared disk information database.

FIG. 7 is a diagram showing a procedure of a proxy response processor 306 of the information processing apparatus 102.

FIGS. 8A and 8B are diagrams showing contents of a shared disk information database according to a second embodiment.

FIGS. 9A and 9B are diagrams showing contents of the shared disk information database.

FIGS. 12A and 12B are diagrams showing contents of a shared disk information database according to a third embodiment.

FIG. 13 is a diagram showing a system configuration according to a fourth embodiment.

DESCRIPTION OF THE EMBODIMENTS

The best mode for carrying out the present invention will be described hereinafter with reference to the accompanying drawings. Note that the scope and spirit of the present invention are not limited by the embodiments below.

First Embodiment

An image formation apparatus according to a first embodiment of the present invention includes a file server, and performs an image formation process based on image formation data stored in the file server. An information processing apparatus of this embodiment mediates file access from a client computer to the file server of the image formation apparatus.

Figure 1:
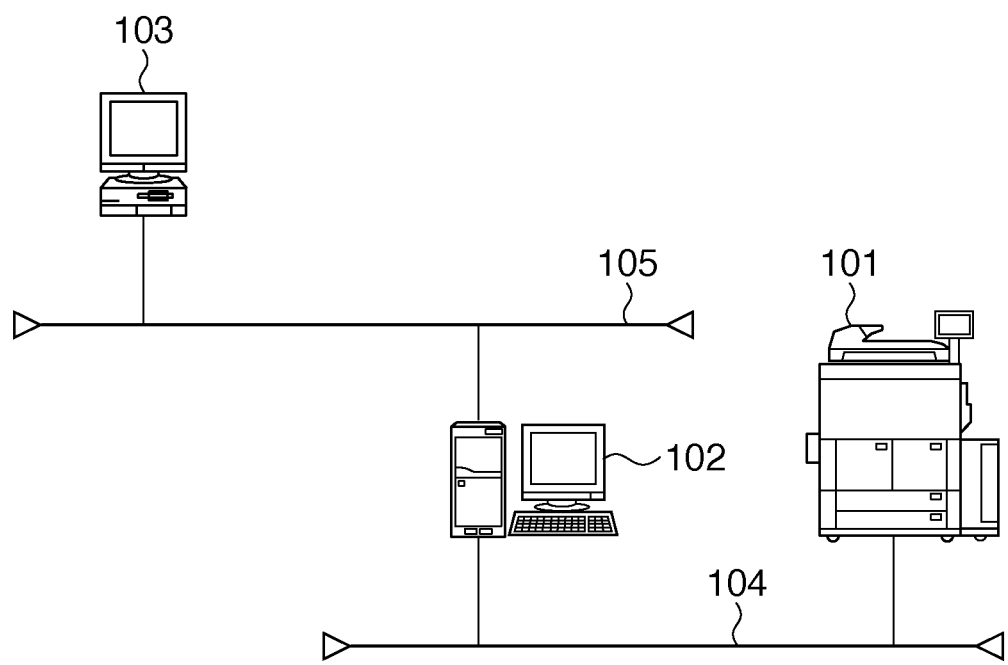
FIG. 1 is a diagram showing a system configuration according to a first embodiment of the present invention.

[System Configuration (FIG. 1)]

An image formation apparatus 101 (processing apparatus) has a plurality of functions, such as a copy function, a file server function, and the like. An information processing apparatus 102 is connected to two networks 104 and 105. A client PC 103 (client computer) is a personal computer (PC) which is operated by a user to save a document file to a shared disk of the image formation apparatus 101. The network 104 connects the image formation apparatus 101 and the information processing apparatus 102. The network 105 connects the information processing apparatus 102 and the client PC 103. The client PC 103 can access the shared disk of the image formation apparatus 101 via the networks 104 and 105. The information processing apparatus 102 is interposed between the image formation apparatus 101 and the client PC 103, and has a function of mediating the transfer of a request from the client PC 103 to the shared disk of the image formation apparatus 101.

Figure 2:
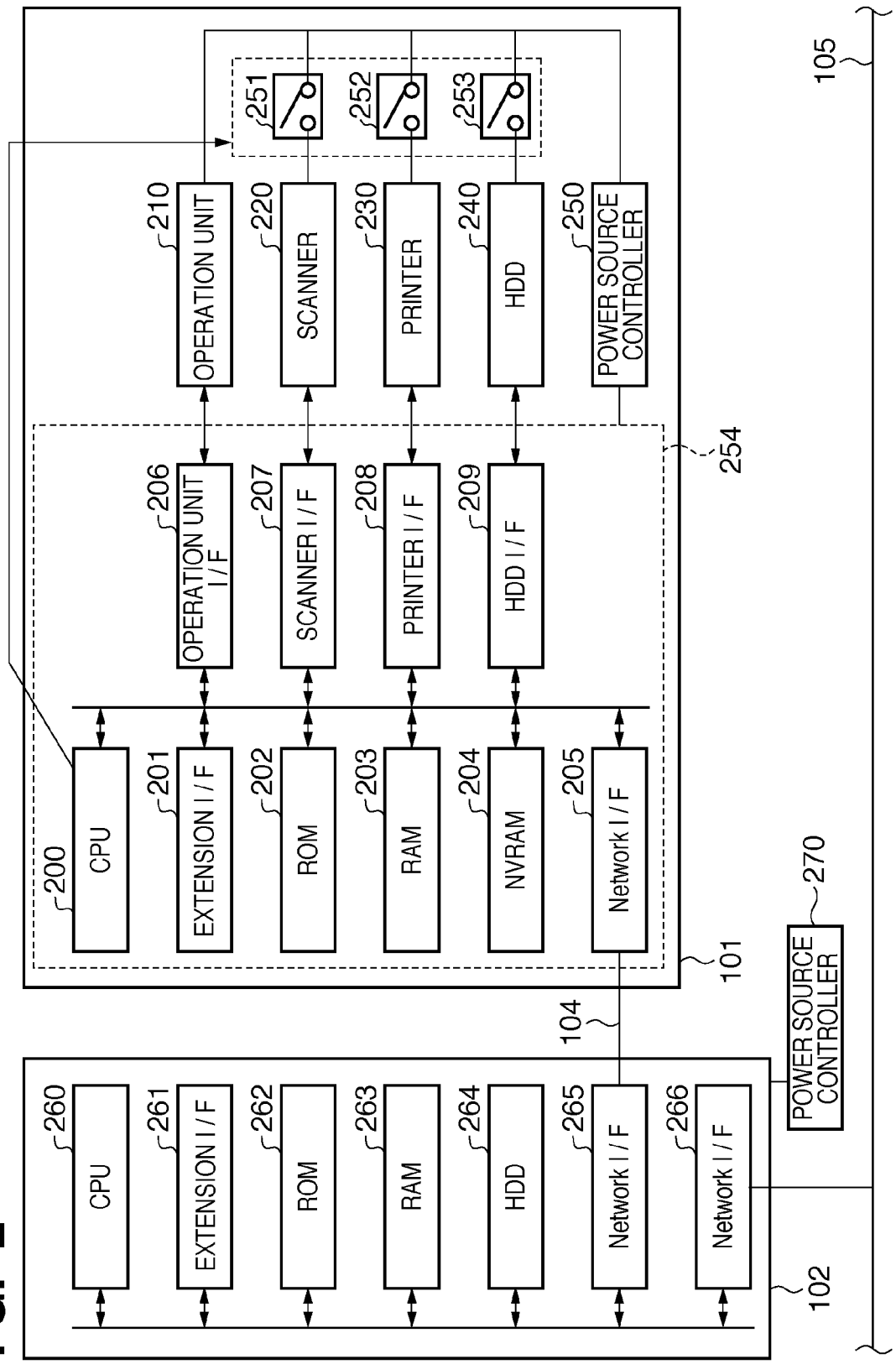
FIG. 2 is a diagram showing hardware configurations of an image formation apparatus 101 and an information processing apparatus 102.

[Hardware Configurations of Image Formation Apparatus 101 and Information Processing Apparatus 102 (FIG. 2)]

(Configuration of Image Formation Apparatus 101)

A CPU 200 executes a software program for the image formation apparatus 101 to control the entire image formation apparatus 101. A random access memory (RAM) 203 is, for example, used to temporarily store data when the CPU 200 controls the image formation apparatus 101. A read only memory (ROM) 202 stores a boot program, fixed parameters, and the like of the image formation apparatus 101. A non-volatile RAM (NVRAM) 204 is used to save various settings of the image formation apparatus 101.

A network interface (I/F) 205 is connected to the network 104, and sends and receives network communication data. An extension I/F 201 is an interface for connecting to another apparatus for general purpose use, and when connected to another apparatus, performs data communication with the apparatus.

An operation unit I/F 206 controls an operation unit 210 so that various operation screens are displayed on a liquid crystal panel included in the operation unit 210, and transfers to the CPU 200 an instruction which is input by a user via the operation screen. A scanner I/F 207 controls a scanner 220. The scanner 220 reads an image on an original and generates image data. A printer I/F 208 controls a printer 230. The printer 230 prints an image onto a recording medium based on the image data. A hard disk drive (HDD) I/F 209 controls an HDD 240. The HDD 240 is used to store various data, and utilized as a network shared disk by a file server function. Specifically, the HDD 240 serving as a file server and the entire image formation apparatus 101 are connected to a common power source.

A power source controller 250 controls a power source which supplies power to the image formation apparatus 101. The power source controller 250 supplies power which is required for operations of the operation unit 210, the scanner 220, the printer 230, the HDD 240, and a controller 254. Of them, switches 251, 252, and 253 are provided for the scanner 220, the printer 230, and the HDD 240, respectively. The CPU 200 can control each switch to shut off power supply from the power source controller 250. Note that the controller 254 indicates the CPU 200, the extension I/F 201, the ROM 202, the RAM 203, the NVRAM 204, the network I/F 205, the operation unit I/F 206, the scanner I/F 207, the printer I/F 208, and the HDD I/F 209.

(Configuration of Information Processing Apparatus 102)

A CPU 260 executes a software program for the information processing apparatus 102 to control the entire information processing apparatus 102. A RAM 263 is, for example, used to temporarily store data when the CPU 260 controls the information processing apparatus 102. A ROM 262 stores a boot program, fixed parameters, and the like of the information processing apparatus 102. An HDD 264 is used to store various data. A network I/F 265 is connected to the network 104, and sends and receives network communication data to and from the image formation apparatus 101. A network I/F 266 is connected to the network 105, and sends and receives network communication data to and from the client PC 103. An extension I/F 261 is an interface for connecting to another apparatus for general purpose use, and when connected to another apparatus, performs data communication with the apparatus. A power source controller 270 controls a power source which supplies power to the information processing apparatus 102.

The image formation apparatus 101 operates by switching between a normal power mode (first power supply mode), and a power saving mode (second power supply mode) in which power consumption is smaller than in the normal power mode. When transitioning from the normal power mode to the power saving mode, the image formation apparatus 101 opens the switches 251, 252, and 253 while maintaining power supply to the controller 254, thereby stopping power supply from the power source controller 250 to the scanner 220, the printer 230, and the HDD 240. On the other hand, the information processing apparatus 102 includes the power source controller 270 which is different from that of the image formation apparatus 101. Therefore, the information processing apparatus 102 does not depend on the power supply state of the image formation apparatus 101, and therefore, can achieve a proxy response function as described below.

Figure 3:
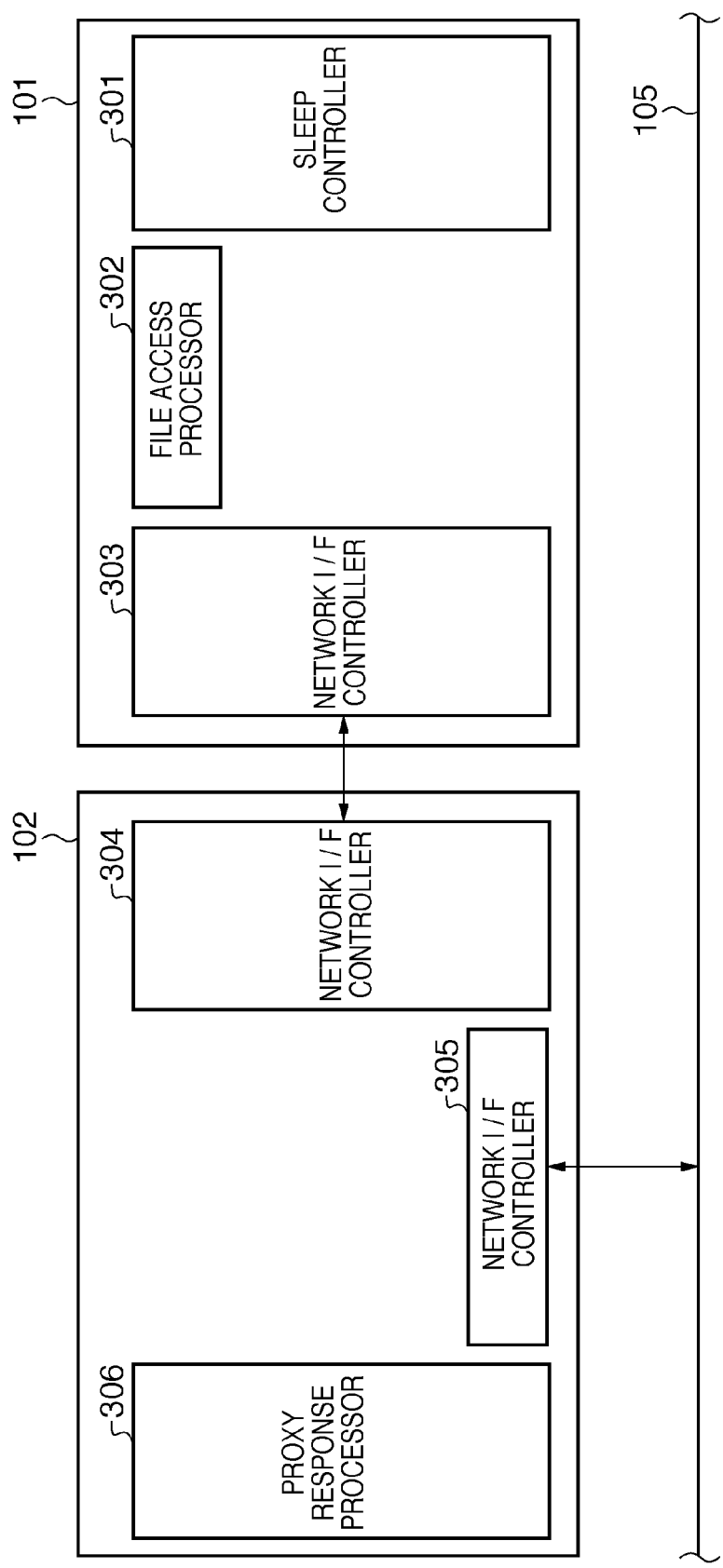
FIG. 3 is a diagram showing software configurations of the image formation apparatus 101 and the information processing apparatus 102.

[Software Configurations of Image Formation Apparatus 101 and Information Processing Apparatus 102 (FIG. 3)]

(Configuration of Image Formation Apparatus 101)

A sleep controller 301 controls the image formation apparatus 101 so that the image formation apparatus 101 switches between the normal power mode and the power saving mode. Note that the sleep controller 301 can operate in the power saving mode as well. In the power saving mode, the sleep controller 301 invariably monitors data reception or the like of the network I/F 205 so as to control switching from the power saving mode to the normal power mode. A file access processor 302 provides a file server function of causing the HDD 240 to be public, i.e., serve as a network shared disk. Specifically, the file access processor 302 controls a protocol for reading and writing a file from and to the HDD 240 and a protocol for sharing a file (WebDAV, CIFS/SMB, etc.). A network I/F controller 303 has a function of sending and receiving the file sharing protocol via the network I/F 205. A network I/F controller 304 has a function of sending and receiving the file sharing protocol via the network I/F 265. Note that the network I/Fs 205 and 265 are connected via the network 104 (see FIG. 2). Therefore, the image formation apparatus 101 and the information processing apparatus 102 conduct data communication with each other via the network I/F controllers 303 and 304.

(Configuration of Information Processing Apparatus 102)

A network I/F controller 305 has a function of sending and receiving to and from the file sharing protocol via the network I/F 266. Note that the network I/F 266 is connected to the network 105, and therefore, the network I/F controller 305 is used to send and receive data to and from the client PC 103. Note that the network I/F controller 305 invariably keeps track of whether the image formation apparatus 101 is operating in the normal power mode or the power saving mode. The network I/F controller 305, when the image formation apparatus 101 is operating in the normal power mode, transfers the file sharing protocol received from the network 105 to the image formation apparatus 101 via the network I/F controller 304. The network I/F controller 305, when the image formation apparatus 101 is operating in the power saving mode, transfers the file sharing protocol received from the network 105 to a proxy response processor 306. The proxy response processor 306 controls the file sharing protocol transferred from the network I/F controller 305. The proxy response processor 306 also has a function of receiving, via the network I/F controller 304, information about a functional setting and a state of the file server which the file access processor 302 has read from the ROM 202, the RAM 203, the NVRAM 204, and the HDD 240. Thereafter, the proxy response processor 306 saves the received functional setting information and state information of the file server into the HDD 264 (storage area) of the information processing apparatus 102. The HDD 264 serves as a shared disk information database described below.

Figure 4:
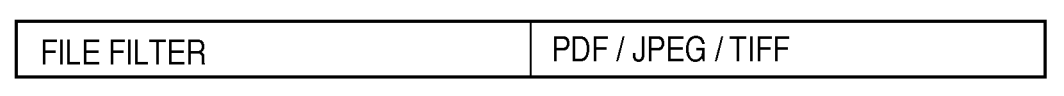

[Contents of Shared Disk Information Database (FIG. 4)]

The shared disk information database stores the functional setting information (condition setting information) and the state information (mode setting information) of the file server of the image formation apparatus 101, and is implemented by the HDD 264 of the information processing apparatus 102. Here, as the functional setting information, a file filter is provided which specifies a file format which is permitted for writing or reading of the file server. Specifically, according to the file sharing protocol, the file filter specifies a file format in which data can be saved in the HDD 240, which has been set as a shared disk. In this embodiment, three file formats PDF, JPEG, and TIFF are set. The file filter is used to save only a printable file(s) in the HDD 240 of the image formation apparatus 101. Therefore, by the setting of the file filter, writing of a file in a file format other than PDF, JPEG, and TIFF to the shared disk is refused.

[Procedure of Image Formation Apparatus 101]

Processes described here are each carried out by the CPU 200 of the image formation apparatus 101 executing a corresponding control program.

Figure 5:
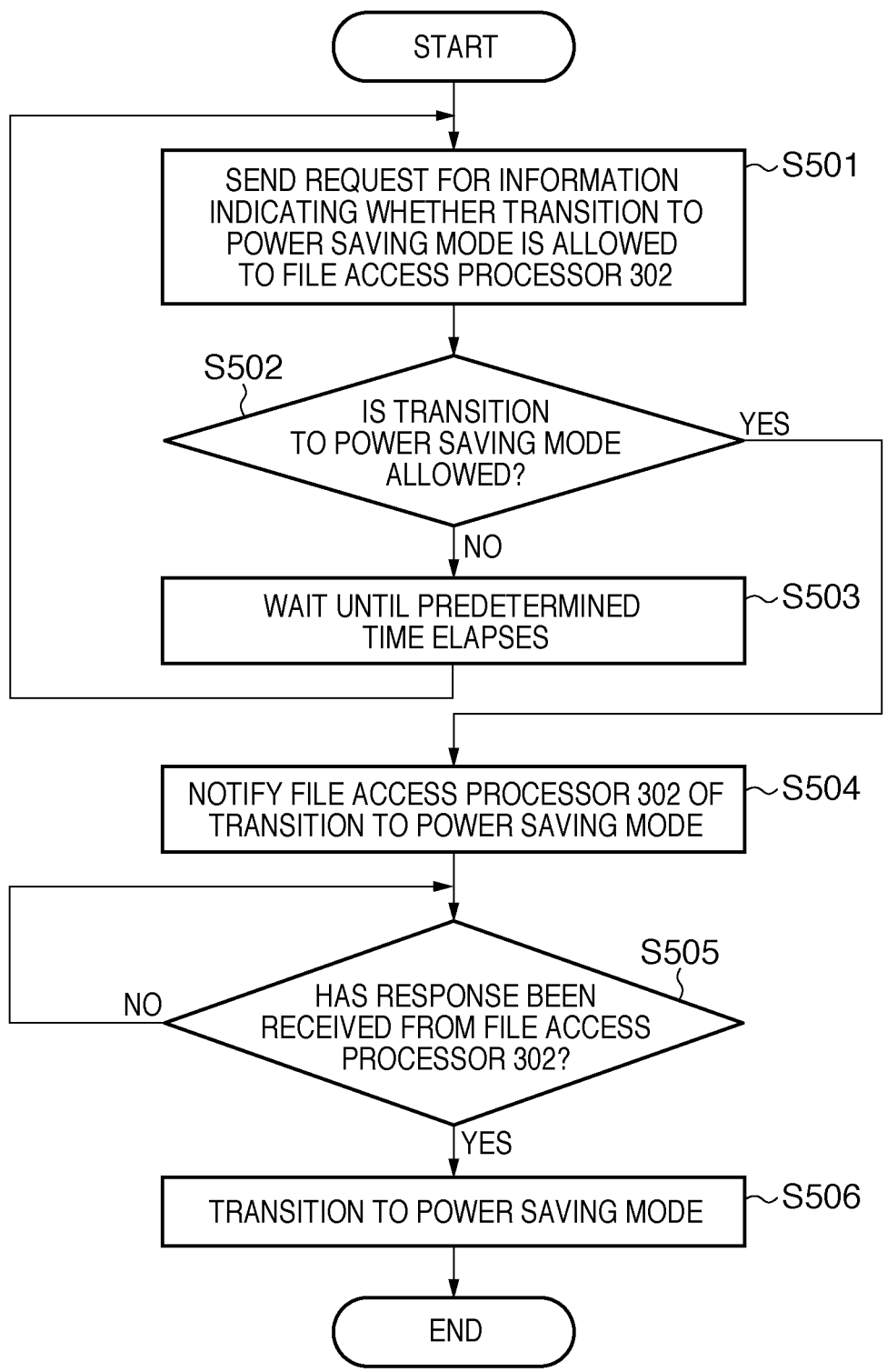
FIG. 5 is a diagram showing a procedure of a sleep controller 301 of the image formation apparatus 101.

(Process of Sleep Controller 301 (FIG. 5))

The sleep controller 301, when detecting that the image formation apparatus 101 has satisfied a condition for transition to the power saving mode, executes the following process. Initially, the sleep controller 301 sends to a previously registered software module, a request for information about whether or not the transition to the power saving mode is allowed (S501). In this embodiment, it is assumed that the file access processor 302 is previously registered as the software module to which the request for information about whether or not the transition to the power saving mode is allowed is sent.

Next, the sleep controller 301 determines whether or not the transition to the power saving mode is allowed, based on a response to the request for information about whether or not the transition to the power saving mode is allowed (S502). When the transition to the power saving mode is not allowed, the sleep controller 301 waits until a predetermined time elapses (S503), and then returns to the process of S501. On the other hand, when the transition to the power saving mode is allowed, the sleep controller 301 notifies the file access processor 302 that the image formation apparatus 101 is going to transition to the power saving mode (S504).

Next, the sleep controller 301 waits for a response from the module (the file access processor 302) which has been notified that the image formation apparatus 101 is going to transition to the power saving mode (S505). When receiving the response from the file access processor 302, the sleep controller 301 causes the image formation apparatus 101 to transition to the power saving mode (S506), and ends the series of processes.

Figure 6:
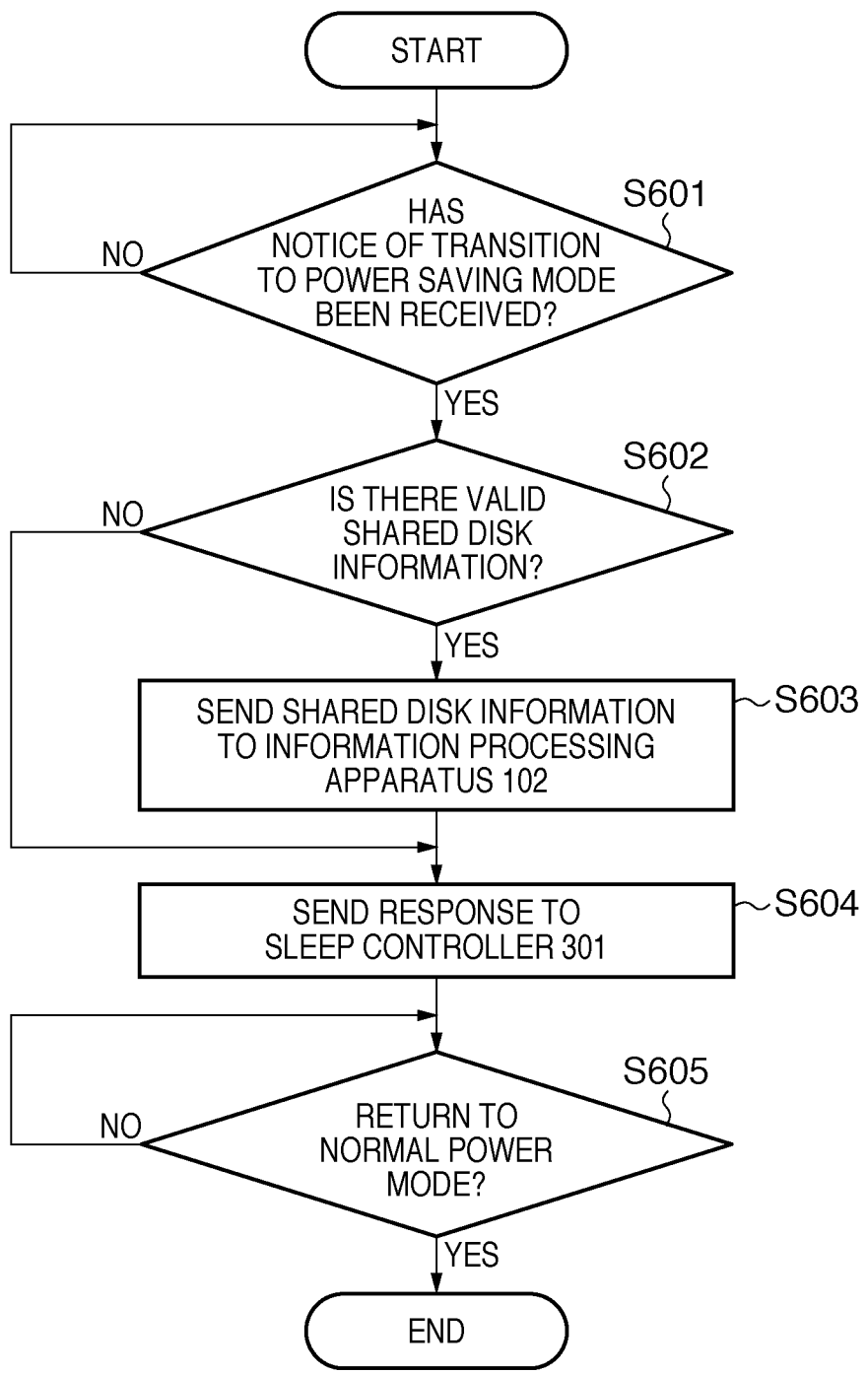
FIG. 6 is a diagram showing a procedure of a file access processor 302 of the image formation apparatus 101.

(Process of File Access Processor 302 (FIG. 6))

Initially, the file access processor 302 waits for the notice of transition to the power saving mode sent from the sleep controller 301, and when receiving the notice, stops the control of the file sharing protocol (S601).

Next, the file access processor 302 determines whether or not there is valid functional setting information or state information of the file server, so as to cause the proxy response processor 306 to perform proxy response (S602). When there is valid functional setting information or state information of the file server, the file access processor 302 reads the valid functional setting information or state information as shared disk information from the ROM 202, the RAM 203, the NVRAM 204, and the HDD 240, and sends the valid functional setting information or state information to the proxy response processor 306 (S603). Note that the valid functional setting information or state information of the file server in this embodiment is the file filter setting of FIG. 4. On the other hand, when there is not valid functional setting information or state information of the file server in S602, control proceeds to S604 without the process of S603 being performed.

Next, the file access processor 302 sends a response to the sleep controller 301 (S604). As a result, the image formation apparatus 101 transitions to the sleep state, i.e., the power saving mode. Thereafter, the file access processor 302 determines whether or not the image formation apparatus 101 has returned from the power saving mode to the normal power mode (S605). When the image formation apparatus 101 has returned to the normal power mode, the file sharing protocol control is resumed.

[Procedure of Information Processing Apparatus 102 (FIG. 7)]

Processes described here are each carried out by the CPU 260 (the proxy response processor 306) of the information processing apparatus 102 executing a corresponding control program. Specifically, the CPU 260 functions as a first reception unit, a second reception unit, and a determination unit. Here, as described above, the image formation apparatus 101, when transitioning from the normal power mode to the power saving mode, sends the condition setting information which is stored in the file server and specifies a permission condition for permission of access to the file server. Thereafter, the information processing apparatus 102, when receiving the condition setting information, stores the condition setting information into the RAM 263, and waits for a process request from the client PC 103. Therefore, a flow shown in FIG. 7 is executed when the image formation apparatus 101 is in the power saving mode.

Initially, the proxy response processor 306 determines whether or not it has received the file sharing protocol (process request) from the client PC 103 to the image formation apparatus 101 (S701). When it has received the file sharing protocol, the proxy response processor 306 analyzes the received file sharing protocol (S702). Thereafter, the proxy response processor 306 determines whether or not the file sharing protocol is information indicating a request for file write (S703). When the file sharing protocol is the file write request, the proxy response processor 306 references the shared disk information database to retrieve the file filter setting, thereby obtaining the condition setting information specifying a file format (permission condition) in which writing to the file server is permitted (S704). On the other hand, when the file sharing protocol is not the file write request, control proceeds to S707.

Thereafter, the proxy response processor 306 compares information about the file sharing protocol analyzed in S702 with the file filter setting obtained in S704 to determine whether or not the file write request specifies a file format which is permitted for writing to the file server (e.g., PDF, JPEG, and TIFF in FIG. 4) (S705). When the file write request specifies a file format (e.g., PDF) which is permitted for writing to the file server, the proxy response processor 306 transfers the received request via the network I/F controller 304 to the image formation apparatus 101 (S707). On the other hand, when the file write request specifies a file format (e.g., EXE) which is not permitted for writing to the file server, the proxy response processor 306 generates response data indicating a refusal of the file write request, and passes the generated response data via the network I/F controller 305 to the sender, i.e., the client PC 103 (S706).

As described above, according to this embodiment, when the image formation apparatus 101 is in the power saving mode, only a process request(s) for which access to the file server is permitted is transferred from a client computer to the file server. Therefore, the number of times of returning the power mode of the processing apparatus (the image formation apparatus 101) from the power saving mode to the normal power mode can be reduced. As a result, the power consumption of the processing apparatus can be reduced.

Although, in this embodiment, it has been assumed that the processing apparatus to which data is transferred from the information processing apparatus 102 is an image formation apparatus, the present invention is not limited to this. The present invention is applicable to any processing apparatuses that include a file server.

Second Embodiment

In this embodiment, an example will be described where an information processing apparatus mediates file access to an image formation apparatus having a file server function, and an access authority of a user who has logged in, directory/file information, and the like are employed. Configurations of a system, an image formation apparatus 101, and an information processing apparatus 102 of this embodiment are similar to those of the first embodiment (see FIG. 1) and will not be described.

[Contents of Shared Disk Information Database (FIGS. 8A, 8B, 9A, and 9B)]

As shown in FIG. 8A, a shared disk information database includes four pieces of information: a free disk space; a user name/password; directory/file information; and a request authority. As in the first embodiment, these pieces of information are sent from the image formation apparatus 101 to the information processing apparatus 102. The free disk space refers to a free disk space of a shared disk to which a user can save data from the client PC 103. For example, when the free disk space is zero, a user cannot save a file. The user name/password refers to a combination of a user name and a password with which a user can access the shared disk. Here, the combination of a user name and a password is obtained by referencing user.db, which will be described below with reference to FIG. 8B. The directory/file information refers to an owner of a directory/file created on the shared disk, an authority to access the directory/file, or the like. Here, the directory/file information is obtained by referencing fileinfo.db which will be described below with reference to FIG. 9A. The request authority refers to a user's authority for each access request to the shared disk. Here, the request authority is obtained by referencing request_acl.db which will be described below with reference to FIG. 9B.

FIG. 8B shows user.db indicating a combination of a user name and a password with which a user can access the shared disk. Two users are registered, and a password is set for each user. User.db is used to determine whether or not access to the shared disk is permitted. Specifically, user.db is used to refuse access from a user who is not registered in user.db or a user who has failed to enter a correct combination of a user name and a password.

FIG. 9A shows fileinfo.db indicating directory/file information. In fileinfo.db, a directory/file path, an owner, an authority 1 (owner), an authority 2 (non-owner), a size, and a date of creation are set. The directory/file path indicates a description in the full-path format of a directory or a file created on the shared disk by a user. The owner indicates the owner of the directory/file, in which a user name specified in user.db is set. The authority 1 (owner) indicates an authority possessed by the owner of the directory/file. The authority 2 (non-owner) indicates an authority possessed by a non-owner of the directory/file. For the authority 1 (owner) and the authority 2 (non-owner), "r" indicates a read authority, "w" indicates a write authority, and "-" indicates the absence of the authoritys. For example, "rw" indicates that both the read authority and the write authority are possessed. Also, "-" indicates that neither the read authority nor the write authority is possessed. The size indicates a size of the directory/file.

The size "-" indicates that no size information is registered. The date of creation indicates a date on which the directory/file was created.

FIG. 9B shows request_acl.db indicating a user's authority for each access request. Here, as an example, request commands in WebDAV will be described. Among access requests are CREATE (create a file), COPY (copy a file), MOVE (move a file), DELETE (delete a file), GET (get a file), and PROPFIND (find a property). For each access request, a user who is refused and a use who is permitted can be set. For example, for CREATE, a user "santaro" is registered as a user who is refused the request, and a user "taro" is registered as a user who is permitted the request. For PROPFIND, no user is registered as a user who is refused the request, and ALL indicating all users who are registered in user.db is registered, indicating that all the users are permitted the request.

[Procedure of Information Processing Apparatus 102]

Next, a procedure with which the information processing apparatus 102 performs proxy response in the file sharing protocol when the image formation apparatus 101 is in the power saving mode will be described. Note that the operation of the image formation apparatus 101 (the sleep controller 301 and the file access processor 302) is similar to that of the first embodiment and will not be described.

(Procedure of Proxy Response Processor 306 (FIG. 10))

Initially, the proxy response processor 306 determines whether or not it has received the file sharing protocol sent from the client PC 103 to the image formation apparatus 101 (S1201). When it has received the file sharing protocol, the proxy response processor 306 analyzes the received file sharing protocol, extracts a user name and a password from a result of the analysis of the protocol, and compares the user name and the password with user.db contained in the shared disk information database to perform authentication with respect to the user name and the password (S1202). Next, as a result of the authentication, the proxy response processor 306 determines whether or not the user name and the password match the information in user.db (S1203). When both the user name and the password match information in user.db, the proxy response processor 306 determines whether or not the protocol analysis result is a file write request (S1204). The write request includes CREATE, COPY, MOVE, and DELETE in the case of, for example, request_act.db. When the protocol analysis result is a file write request, the proxy response processor 306 determines whether or not proxy response is required for the write request (write request checking process) (S1205). Note that details of this process will be described below with reference to FIG. 11A. On the other hand, when the protocol analysis result is a file read request, but not a file write request, the proxy response processor 306 determines whether or not proxy response is required for the read request (read request checking process) (S1206). Note that details of this process will be described below with respect to FIG. 11B.

On the other hand, when at least one of the user name and the password does not match any information in user.db in S1203, the proxy response processor 306 determines that proxy response is required for the received file sharing protocol, and sets a proxy response flag (the flag is on) and stores the proxy response flag into an area allocated in the RAM 263 (S1210). Next, the proxy response processor 306 generates proxy response data indicating the failure of authentication, and stores the proxy response data into an area allocated in the RAM 263 (S1211).

After the process of S1205, S1206, or S1211 is completed, the proxy response processor 306 references the proxy response flag to determine whether or not proxy response is required (S1207). When the proxy response flag is on, the proxy response processor 306 returns a response to the request sender by passing the proxy response data stored in the RAM 263 to the network I/F controller 305 (S1208). When the proxy response flag is off, the proxy response processor 306 transfers the received request via the network I/F controller 304 to the image formation apparatus 101 (S1209).

(Details of Write Request Checking Process S1205 (FIG. 11A))

The proxy response processor 306 extracts a user name and an access request from the protocol analysis result, and compares the user name and the access request with request_acl.db contained in the shared disk information database to determine whether or not the access is from a user having a user's authority with respect to the access request (S1301). When the access is from a user who does not have the authority, the proxy response processor 306 determines that proxy response is required, and sets the proxy response flag (the flag is on) (S1305). Thereafter, the proxy response processor 306 generates proxy response data indicating a refusal of write, stores the proxy response data into an area allocated in the RAM 263 (S1306), and ends the series of processes. On the other hand, when the access is from a user who has the authority, the proxy response processor 306 extracts information about a directory to be accessed and a user name from the protocol analysis result, and compares the information and the user name with fileinfo.db contained in the shared disk information database to determine whether or not the user has an authority to write a file into the directory (S1302). When the user does not have the write authority, control proceeds to S1305. On the other hand, when the user has the write authority, the proxy response processor 306 extracts the size of a file to be written from the protocol analysis result, and compares the file size with a free disk space described in the shared disk information database to determine whether or not the file can be written (S1303).

For example, it is assumed that a user having a user name "taro" issues a file write request with respect to a folder "\taro\private". In this case, because the folder "\taro\private" imparts a write authority to the owner ("rw" is set in the authority 1), control proceeds to S1303. On the other hand, it is assumed that a user having a user name "santaro" issues a file write request with respect to the folder "\taro\private". In this case, because the folder "\taro\private" does not impart a write authority to non-owners ("-" is set in the authority 2), control proceeds to S1305.

When write is not allowed, control proceeds to S1305. On the other hand, when write is allowed, the proxy response processor 306 determines not to perform proxy response (S1304), and ends the write request checking process.

Figure 11A:
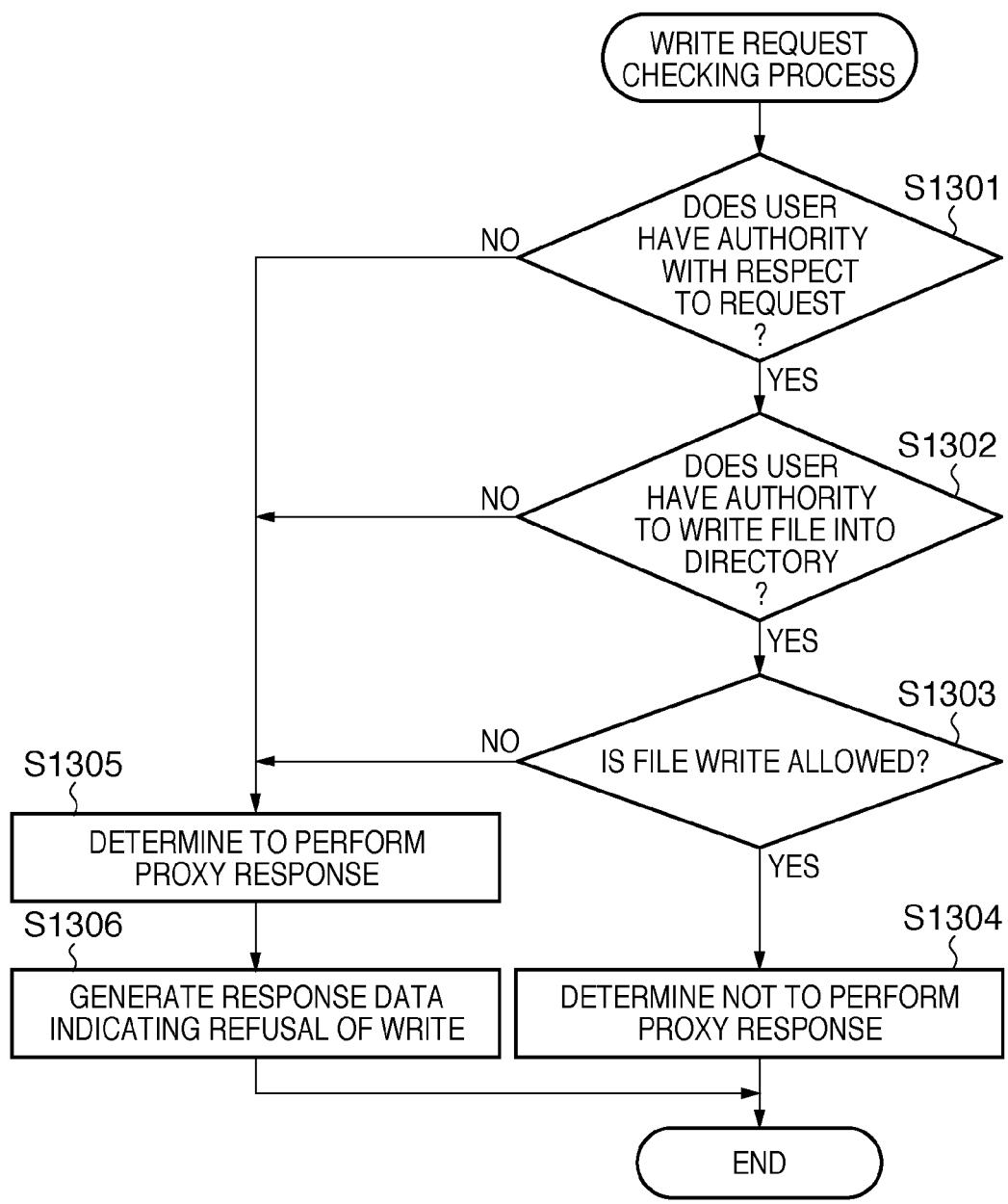
FIG. 11A is a diagram showing a detailed procedure of a write request checking process.
Figure 11B:
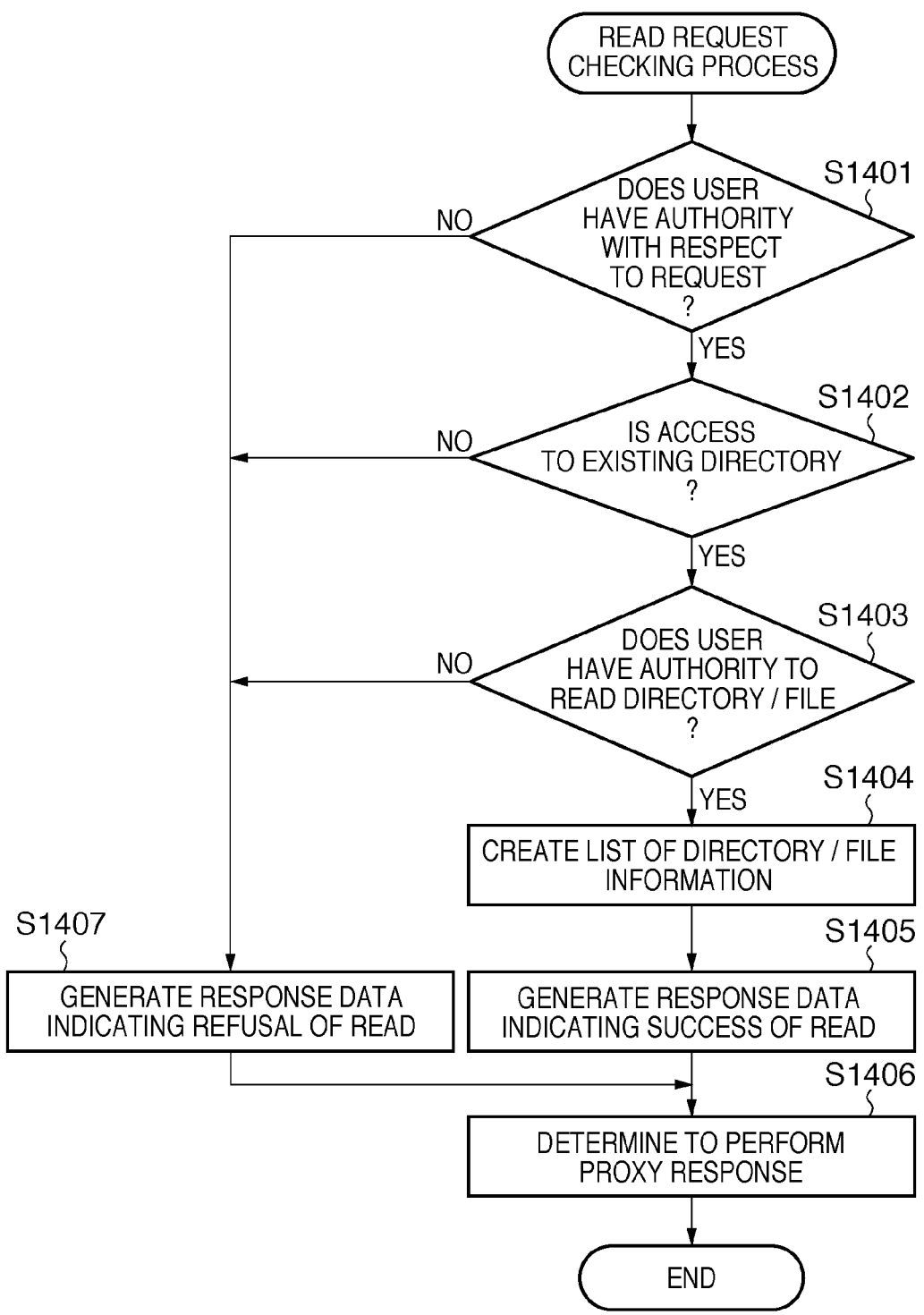
FIG. 11B is a diagram showing a detailed procedure of a read request checking process.

(Details of Read Request Checking Process S1206 (FIG. 11B)

Initially, the proxy response processor 306 extracts a user name and an access request from the protocol analysis result, and compares the user name and the access request with request_acl.db contained in the shared disk information database to determine whether or not the user has a user's authority with respect to the access request (S1401). When the user does not have the user's authority, the proxy response processor 306 generates proxy response data indicating a refusal of write, and stores the proxy response data into an area allocated in the RAM 263 (S1407). On the other hand, when the user has the user's authority, the proxy response processor 306 extracts information about a directory/file to be accessed from the protocol analysis result, and compares the information with fileinfo.db contained in the shared disk information database to determine whether or not read is to be performed with respect to an existing directory/file (S1402). When read is to be performed with respect to a non-existing directory/file, control proceeds to S1407. On the other hand, when read is to be performed with respect to an existing directory/file, the proxy response processor 306 extracts information about a directory/file to be accessed and a user name from the protocol analysis result, and compares the information and the user name with fileinfo.db contained in the shared disk information database to determine whether or not the user has an authority to read the directory/file (S1403). When the user does not have the read authority, control proceeds to S1407. On the other hand, when the user has the read authority, the proxy response processor 306 creates a list of directory/file information from fileinfo.db contained in the shared disk information database so as to generate response data (S1404). For example, when a PROPFIND request for finding file information in a directory is received, information in the directory, such as a file name, a date of creation, or the like, is required as response data.

Next, the proxy response processor 306 uses the directory/file information data to generate proxy response data indicating the success of read, and stores the proxy response data into an area allocated in the RAM 263 (S1405), and determines to perform proxy response (S1406). Thereafter, the proxy response processor 306 sets the proxy response flag (the flag is on), and ends the read request checking process.

As described above, according to this embodiment, proxy response can be performed based on a user's authority for each request which is functional setting information of the file server and directory/file information or a free disk space which are state information of the file server varying depending on the operation.

Note that the items of fileinfo.db of this embodiment are only for illustrative purposes. Various other items, such as a date of update, a date of access, a title, a memo, and the like, may be provided. Although the file filter function described in the first embodiment is not described in this embodiment, the file filter function may be combined with this embodiment.

Third Embodiment

In this embodiment, proxy response is performed by using authority information relating to a group to which a user belongs as well. Configurations of a system, an image formation apparatus 101, and an information processing apparatus 102 are similar to those of the first and second embodiments (see FIG. 1) and will not be described. A shared disk information database contains contents similar to those described in the second embodiment with reference to FIGS. 8A and 9B, and other contents which will be described with reference to FIGS. 12A and 12B.

[Contents of Shared Disk Information Database (FIGS. 12A and 12B)]

FIG. 12A shows user.db indicating combinations of a user name, a password, and a user membership group with which a user can access a shared disk. User.db additionally includes information about a group to which a user belongs compared to FIG. 8B of the second embodiment. Two users are registered. For each user, a password and membership group information are set. User.db is used to determine whether or not access to the shared disk is permitted, and in addition, obtain a user's membership group information.

FIG. 12B corresponds to FIG. 9A of the second embodiment and shows fileinfo.db indicating directory/file information. In fileinfo.db, a directory/file path, an owner, an authority 1 (owner), an authority 2 (group), an authority 3 (other), a size, and a date of creation are set. The directory/file path indicates a description in the full-path format of a directory or a file created on the shared disk by a user. The owner indicates the owner of the directory/file, in which a user name specified in user.db is set. The authority 1 (owner) indicates an authority possessed by the owner of the directory/file. The authority 2 (group) indicates an authority possessed by a user belonging to the same group as that to which the owner of the directory/file belongs. The authority 3 (other) indicates an authority possessed by a user belonging to a group other than that to which the owner of the directory/file belongs. For the authority 1 (owner), the authority 2 (group), and the authority 3 (other), "r" indicates a read authority, "w" indicates a write authority, and "-" indicates the absence of the authoritys. For example, "rw" indicates that both the read authority and the write authority are possessed. Also, "-" indicates that neither the read authority nor the write authority is possessed. The size indicates a size of the directory/file. The size "-" indicates that no size information is registered. The date of creation indicates a date on which the directory/file was created.

According to the above procedure, the concept of an authority of a group to which a user belongs can be added to the shared disk information database.

[Procedure of Proxy Response Processor 306 (Not Shown)]

Figure 10:
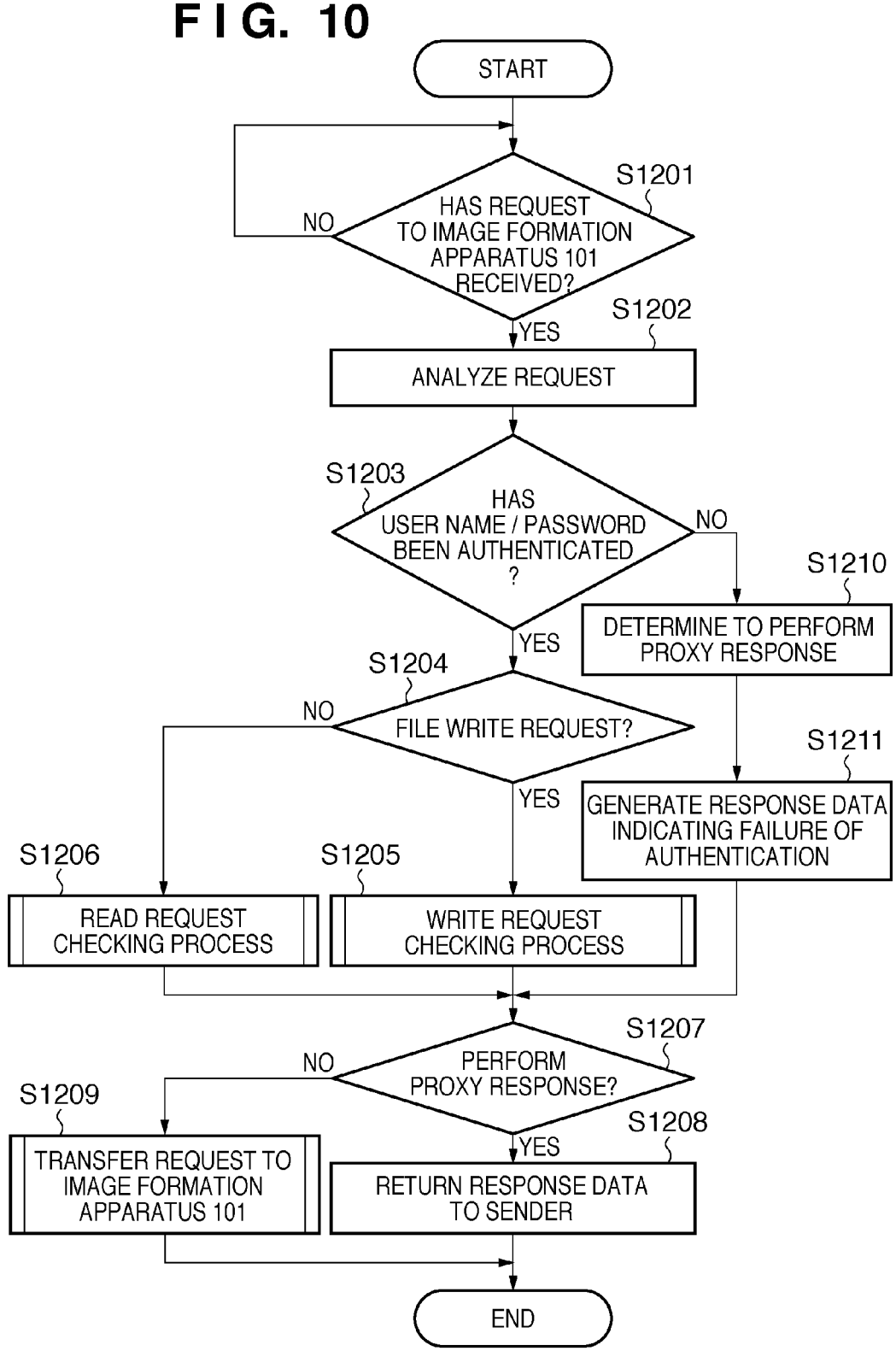
FIG. 10 is a diagram showing a procedure of the proxy response processor 306 of the information processing apparatus 102.

The flowchart of the proxy response processor 306 is basically similar to that of FIGS. 10, 11A, and 11B, except for S1302 and S1403, and will not be described. The group authority can be checked by considering the authority 2 (group) or the authority 3 (other) of fileinfo.db in S1302 and S1403. Specifically, a case where a user having a user name "santaro" accesses a directory having a directory name "\group1" will be assumed and described. It can be seen from fileinfo.db that, for the directory "\group1", a user having a user name "taro" is an owner, the owner has the "rw" authority; a user belonging to the same group as that of the owner has the "rw" authority, and a user belonging to a group different from that of the owner has neither of the read and write authoritys. Moreover, it can be seen from user.db that the user "santaro" belongs to a group different from that to which the user "taro" belongs. As a result, it can be determined that the user "santaro" cannot access the directory "\group1".

As described above, according to this embodiment, proxy response can be performed by using information about the authority of a group to which a user belongs as well.

Note that the items of fileinfo.db of this embodiment are only for illustrative purposes. Various other items, such as a date of update, a date of access, a title, a memo, and the like, may be provided. Although the file filter function described in the first embodiment is not described in this embodiment, the file filter function may be combined with this embodiment.

Fourth Embodiment

In this embodiment, a network controller having a proxy response function provided in an image formation apparatus performs a transfer control with respect to file access to a file server of the image formation apparatus. Specifically, the information processing apparatus described in each of the above embodiments may be incorporated into the image formation apparatus. Note that, in this embodiment, a process similar to the proxy response process (FIGS. 5-7) performed by the file filter described in the first embodiment is performed.

[System Configuration (FIG. 13)]

An image formation apparatus 1701 has a plurality of functions, such as a copy function, a file server function, and the like. A client PC 1702 is a personal computer (PC) which is operated by a user when the user saves a document file to a shared disk provided in the image formation apparatus 1701. A network 1703 connects the image formation apparatus 1701 and the client PC 1702. The client PC 1702 can access a file server which is a shared disk of the image formation apparatus 1701 via the network 1703.

Figure 14:
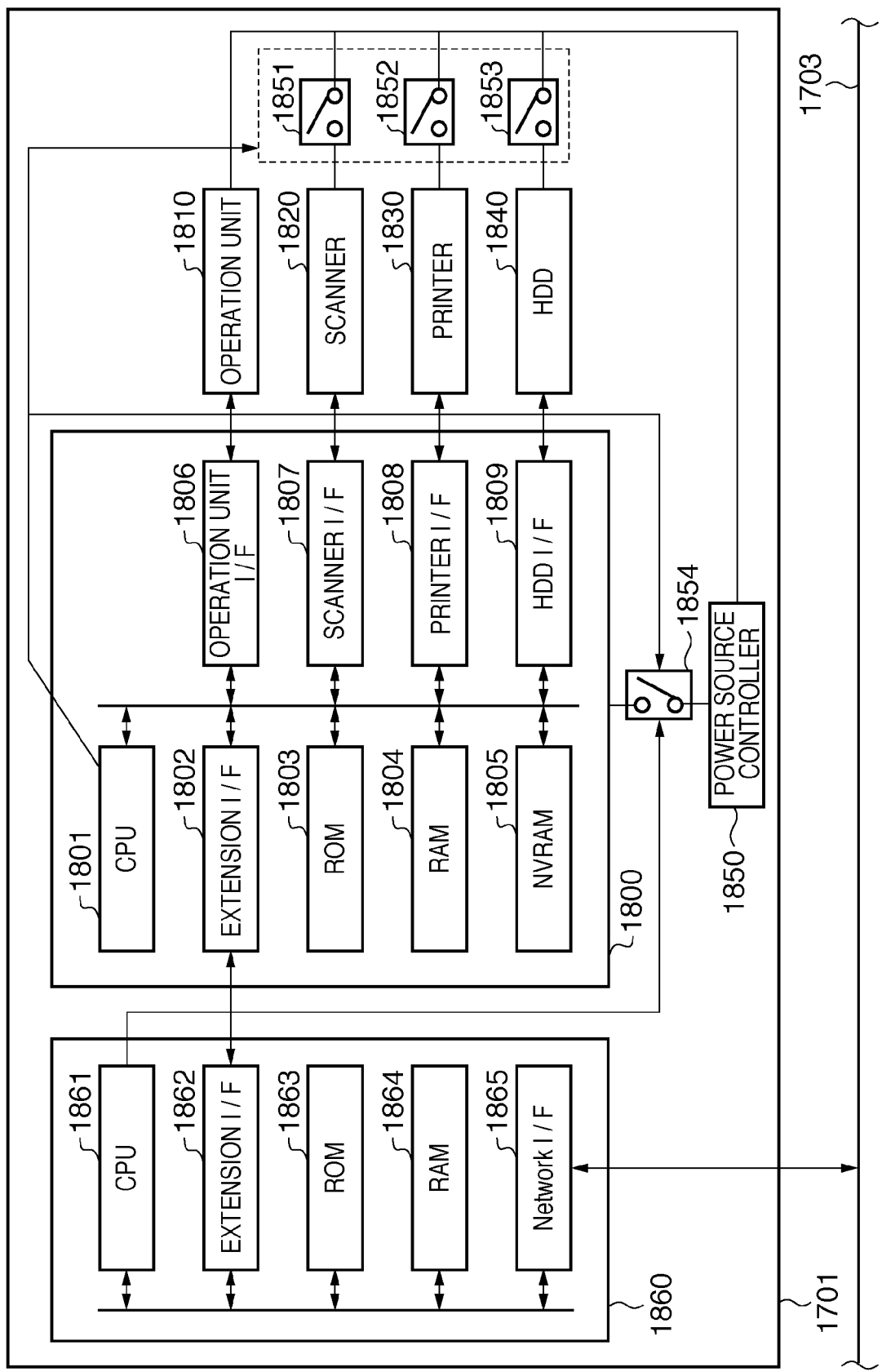
FIG. 14 is a diagram showing hardware configurations of an image formation apparatus 101 and an information processing apparatus 102.

[Hardware Configuration (FIG. 14)]

The image formation apparatus 1701 includes an information processing apparatus 1800 and a network controller 1860. The information processing apparatus 1800 is connected via the network controller 1860 to the network 1703.

A CPU 1801 executes a software program for the information processing apparatus 1800 to control the entire information processing apparatus 1800. A RAM 1804 is, for example, used to temporarily store data when the CPU 1801 controls the information processing apparatus 1800. A ROM 1803 stores a boot program, fixed parameters, and the like of the information processing apparatus 1800. An NVRAM 1805 is used to save various settings of the information processing apparatus 1800. An extension I/F 1802 is connected to an extension I/F 1862 in the network controller 1860, and controls data communication with the client PC 1702 on the network 1703 via the network controller 1860.

An operation unit I/F 1806 controls an operation unit 1810 so that various operation screens are displayed on a liquid crystal panel included in the operation unit 1810, and transfers to the CPU 1801 an instruction which is input by a user via the operation screen. A scanner I/F 1807 controls a scanner 1820. The scanner 1820 reads an image on an original to generate image data. A printer I/F 1808 controls a printer 1830. The printer 1830 prints an image onto a recording medium based on the image data. An HDD I/F 1809 controls an HDD 1840. The HDD 1840 is used to store various data, and is also used as a network shared disk by a file server function.

A power source controller 1850 controls a power source which supplies power to the image formation apparatus 1701. The power source controller 1850 supplies power required for operations of the information processing apparatus 1800, the operation unit 1810, the scanner 1820, the printer 1830, the HDD 1840, and the network controller 1860. Of them, the information processing apparatus 1800, the scanner 1820, the printer 1830, and the HDD 1840 include switches 1851, 1852, 1853, and 1854, respectively. The CPU 1801 controls each switch to shut off power supply from the power source controller 1850. The switch 1854 can be controlled by a CPU 1861 as well.

The CPU 1861 executes a software program for the network controller 1860 to control the entire network controller 1860. A RAM 1864 is, for example, used to temporarily store data when the CPU 1861 controls the network controller 1860. A ROM 1863 stores a boot program, fixed parameters, and the like of the network controller 1860.

A network I/F 1865 is connected to the network 1703, and sends and receives network communication data to and from the client PC 1702. The extension I/F 1862 is connected to the extension I/F 1802 in the information processing apparatus 1800, and controls data communication between the information processing apparatus 1800 and the network controller 1860.

The information processing apparatus 1800 operates by switching between a normal power mode, and a power saving mode in which power consumption is less than that in the normal power mode. When transitioning from the normal power mode to the power saving mode, the CPU 1801 can control the switches 1851, 1852, 1853, and 1854 to stop power supply from the power source controller 1850.

On the other hand, power supply is not stopped for the network controller 1860 by the switch control as is different from the information processing apparatus 1800. Therefore, even when the information processing apparatus 1800 is in the power saving mode, power supply from the power source controller 1850 to the network controller 1860 is continued, and therefore, a proxy response function described below can be provided. Moreover, when the information processing apparatus 1800 transitions from the power saving mode to the normal power mode, the CPU 1861 can control the switch 1854 so that power supply to the information processing apparatus 1800 is resumed.

[Software Configuration (FIG. 15)]

Figure 15:
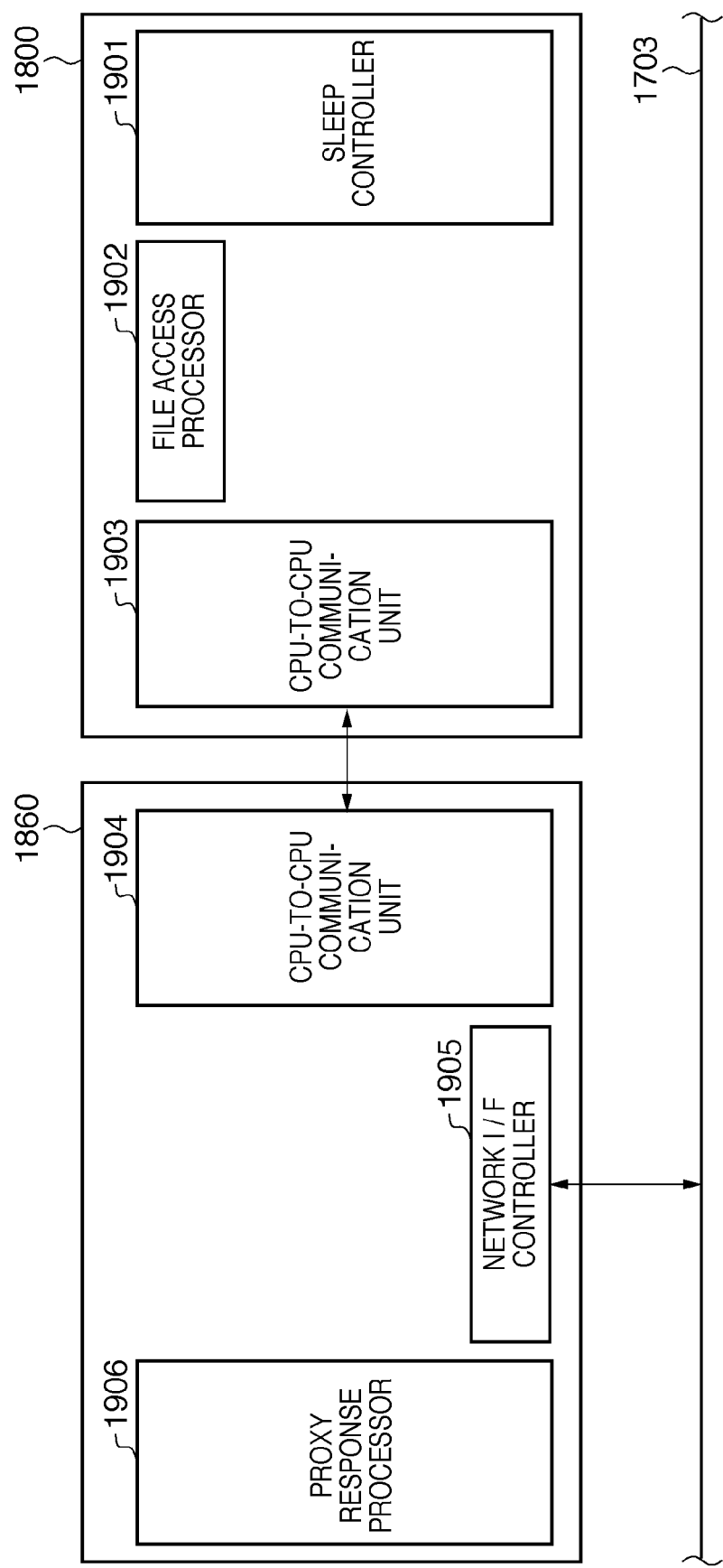
FIG. 15 is a diagram showing software configurations of an information processing apparatus 1800 and a network controller 1860.

FIG. 15 shows software configurations of the information processing apparatus 1800 and the network controller 1860. A sleep controller 1901 controls the switching of the information processing apparatus 1800 between the normal power mode and the power saving mode. A file access processor 1902 provides a file server function of causing the HDD 1840 to be public, i.e., serve as a network shared disk. Specifically, the file access processor 1902 controls a protocol for reading and writing a file from and to the HDD 1840 and a protocol for sharing a file (WebDAV, CIFS/SMB, etc.). A CPU-to-CPU communication unit 1903 has a function of sending and receiving data to and from software operating in the network controller 1860 via the extension I/F 1802 and the extension I/F 1862. A CPU-to-CPU communication unit 1904 has a function of sending and receiving data to and from software operating in the information processing apparatus 1800 via the extension I/F 1862 and the extension I/F 1802.

A network I/F controller 1905 has a function of sending and receiving a file sharing protocol via the network I/F 1865. Note that the network I/F controller 1905 invariably keeps track of whether the information processing apparatus 1800 is operating in the normal power mode or the power saving mode. The network I/F controller 1905, when the information processing apparatus 1800 is operating in the normal power mode, transfers the file sharing protocol received from the network 1703 to the information processing apparatus 1800. The network I/F controller 1905, when the information processing apparatus 1800 is operating in the power saving mode, transfers the file sharing protocol received from the network 1703 to a proxy response processor 1906.

The proxy response processor 1906 controls the file sharing protocol transferred from the network I/F controller 1905. The proxy response processor 1906 also has a function of receiving, via the CPU-to-CPU communication unit 1904, functional setting information or state information of a file server read from the ROM 1803, the RAM 1804, the NVRAM 1805, or the HDD 1840 by the file access processor 1902. Thereafter, the proxy response processor 1906 saves the received functional setting information or state information of the file server as a shared disk information database described below to the RAM 1864 of the network controller 1860.

As described above, according to this embodiment, even when file access to an image formation apparatus having a file server function is mediated by a network controller having a proxy response function, an advantage similar to that of the first embodiment can be obtained.

Note that even when file access to a file server of an image formation apparatus is mediated by a network I/F having a proxy response function provided in the image formation apparatus, the present invention is applicable. In this case, the proxy response process is applicable to any of the process (see FIGS. 5-7) employing the file filter (see FIG. 4) described in the first embodiment, the process (see FIGS. 10, 11A, and 11B) employing a user's access authority, directory/file information, or the like (see FIGS. 8A, 8B, 9A, and 9B) described in the second embodiment, and the process employing authority information about a user's membership group or the like (see FIGS. 12A and 12B) described in the third embodiment. As a result, even when file access to an image formation apparatus having a file server function is mediated by a network I/F having a proxy response function, an advantage similar to that of the first to fourth embodiments can be obtained.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-291403, filed Dec. 22, 2009, which is hereby incorporated by reference herein in its entirety.

What is claimed is:

1. An information processing apparatus configured for communication with a client computer and a processing apparatus including a file server, the information processing apparatus comprising:
a first reception unit configured to receive condition setting information which specifies a permission condition for permitting access to the file server and which is sent from the file server, wherein the processing apparatus, when operating in a first power supply mode, determines whether to permit or refuse access to the file server based on the permission condition specified in the condition setting information;
a second reception unit configured to receive a process request with respect to the file server from the client computer;
a determination unit configured to determine whether the process request received by the second reception unit satisfies the permission condition specified in the condition setting information received by the first reception unit, when the second reception unit has received the process request and the processing apparatus is operating in a second power supply mode in which power consumption is less than that in the first power supply mode; and
a transfer control unit configured to send a response indicating a refusal of access to the client computer without transferring the process request received by the second reception unit to the file server when the determination unit has determined that the permission condition is not satisfied.

2. The information processing apparatus of claim 1, wherein the condition setting information specifies a file format which is permitted for writing or reading of the file server, and the determination unit determines whether the process request received by the second reception unit is the permitted file format.

3. The information processing apparatus of claim 1, wherein the condition setting information specifies a user who is permitted access to the file server, and the determination unit determines whether the process request received by the second reception unit has been performed by the permitted user.

4. The information processing apparatus of claim 1, wherein the first reception unit receives information indicating a directory or a file to be accessed in addition to the condition setting information.

5. The information processing apparatus of claim 1, wherein the processing apparatus is an image formation apparatus configured to perform an image formation process based on image formation data stored in the file server.

6. The information processing apparatus of claim 1, wherein, in the second power supply mode, at least power supply to the file server is stopped in the processing apparatus, and the transfer control unit, when the determination unit has determined that the permission condition is satisfied, sends a request for returning to the first power supply mode to the processing apparatus before transferring the process request received by the second reception unit to the file server.

7. A method for controlling an information processing apparatus configured for communication with a client computer and a processing apparatus including a file server, the method comprising the steps of:
receiving condition setting information which specifies a permission condition for permitting access to the file server and which is sent from the file server, wherein the processing apparatus, when operating in a first power supply mode, determines whether to permit or refuse access to the file server based on the permission condition specified in the condition setting information;
receiving a process request with respect to the file server from the client computer;
determining, when the process request has been received and the processing apparatus is operating in a second power supply mode in which power consumption is less than that in the first power supply mode, whether the received process request satisfies the permission condition specified in the received condition setting information; and
sending a response indicating a refusal of access to the client computer without transferring the received process request to the file server when it has been determined that the permission condition is not satisfied.

8. A non-transitory computer-readable storage medium on which is stored computer executable code of a program for causing a computer to execute a method for controlling an information processing apparatus configured for communication with a client computer and a processing apparatus including a file server, the method comprising the steps of:
receiving condition setting information which specifies a permission condition for permitting access to the file server and which is sent from the file server, wherein the processing apparatus, when operating in a first power supply mode, determines whether to permit or refuse access to the file server based on the permission condition specified in the condition setting information;
receiving a process request with respect to the file server from the client computer;

determining, when the process request has been received and the processing apparatus is operating in a second power supply mode in which power consumption is less than that in the first power supply mode, whether the received process request satisfies the permission condition specified in the received condition setting information; and sending a response indicating a refusal of access to the client computer without transferring the received process request to the file server when it has been determined that the permission condition is not satisfied.

9. An information processing apparatus configured for communication with a client computer and a processing apparatus including a file server, the information processing apparatus comprising:

a first reception unit configured to receive condition setting information which specifies a permission condition for permitting a file to be stored in the file server, the condition setting information being sent from the file server when the processing apparatus transitions from a first power supply mode to a second power supply mode in which power consumption is less than that in the first power supply mode;

a second reception unit configured to receive a process request with respect to the file server from the client computer;

a determination unit configured to determine, based on the permission condition received by the first reception unit, whether a file specified by the process request received by the second reception unit is permitted to be stored in the file server; and a transfer control unit configured to send a response indicating a refusal of storing the file in the file server to the client computer without transferring the process request received by the second reception unit to the file server when the determination unit has determined that the file specified by the process request is not permitted to be stored in the file server.

10. The information processing apparatus to claim 9, wherein the condition setting information specifies a user who is permitted access to the file server, and the determination unit determines whether the process request received by the second reception unit has been performed by the permitted user.

11. The information processing apparatus of claim 9, wherein the first reception unit receives information indicating a directory or a file to be accessed in addition to the condition setting information.

12. The information processing apparatus of claim 9, wherein the processing apparatus is an image formation apparatus configured to perform an image formation process based on image formation data stored in the file server.

13. The information processing apparatus of claim 9, wherein, in the second power supply mode, at least power supply to the file server is stopped in the processing apparatus, and the transfer control unit, when the determination unit has determined that the file specified by the process request is permitted to be stored in the file server, sends a request for returning to the first power supply mode to the processing apparatus before transferring the process request received by the second reception unit to the file server.

14. A method for controlling an information processing apparatus configured for communication with a client computer and a processing apparatus including a file server, the method comprising the steps of:

receiving condition setting information which specifies a permission condition for permitting a file to be stored in the file server, the condition setting information being sent from the file server when the processing apparatus transitions from a first power supply mode to a second power supply mode in which power consumption is less than that in the first power supply mode;

receiving a process request with request to the file server from the client computer;

determining, based on the received permission condition, whether a file specified by the received process request is permitted to be stored in the file server; and sending a response indicating a refusal of storing the file in the file server to the client computer without transferring the received process request to the file server when it has been determined that the file specified by the process request is not permitted to be stored in the file server.

15. A non-transitory computer-readable storage medium on which is stored computer executable code of a program for causing a computer to execute the method for controlling an information processing apparatus configured for communication with a client computer and a processing apparatus including a file server, the method comprising the steps of:

receiving condition setting information which specifies a permission condition for permitting a file to be stored in the file server, the condition setting information being sent from the file server when the processing apparatus transitions from a first power supply mode to a second power supply mode in which power consumption is less than that in the first power supply mode;

receiving a process request with request to the file server from the client computer;

determining, based on the received permission condition, whether a file specified by the received process request is permitted to be stored in the file server; and sending a response indicating a refusal of storing the file in the file server to the client computer without transferring the received process request to the file server when it has been determined that the file specified by the process request is not permitted to be stored in the file server.

* * * * *